March 6, 1956     R. E. JIMERSON     2,737,226
TIRE TREAD REBUILDING MACHINE

Filed Sept. 30, 1953     3 Sheets-Sheet 1

*INVENTOR.*
RALPH E. JIMERSON

BY *Knox & Knox*

AGENTS FOR APPLICANT

March 6, 1956  R. E. JIMERSON  2,737,226
TIRE TREAD REBUILDING MACHINE
Filed Sept. 30, 1953  3 Sheets-Sheet 2
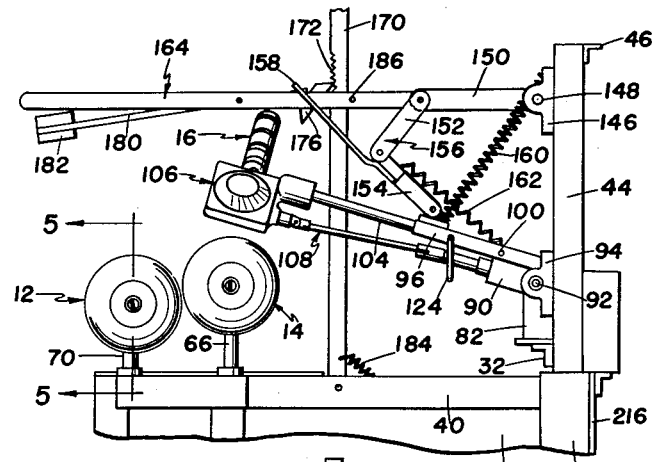
Fig. 3
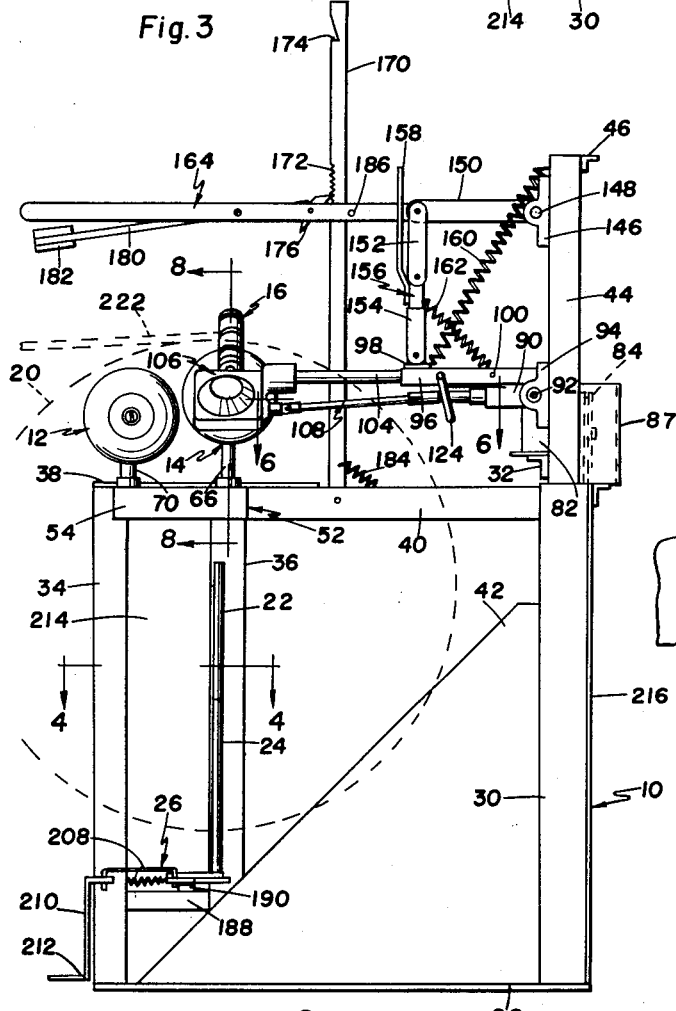
Fig. 2
Fig. 5
Fig. 6
INVENTOR.
RALPH E. JIMERSON
BY 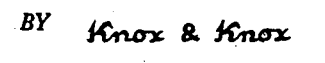
AGENTS FOR APPLICANT March 6, 1956 R. E. JIMERSON 2,737,226
TIRE TREAD REBUILDING MACHINE
Filed Sept. 30, 1953 3 Sheets-Sheet 3

INVENTOR.
RALPH E. JIMERSON
BY Knox & Knox
AGENTS FOR APPLICANT

United States Patent Office 2,737,226
Patented Mar. 6, 1956

2,737,226

TIRE TREAD REBUILDING MACHINE

Ralph E. Jimerson, South San Gabriel, Calif.

Application September 30, 1953, Serial No. 383,165

21 Claims. (Cl. 154—9)

The present invention relates generally to pneumatic tires and more particularly to a tire tread rebuilding machine. The purpose of the machine is to apply a strip of rubber, or camelback as it is commonly known, around the periphery of a worn tire to provide the extra thickness needed for reforming the treads.

The primary object of this invention is to provide improved means for mounting and driving a flexible roller in a tire tread rebuilding machine in which the camelback is applied to the tire by a driven flexible roller which also rotates the tire to secure the camelback evenly around the tire.

Another object of this invention is to provide a tire tread rebuilding machine which is easily adjustable to receive different sizes of tires.

Another object of this invention is to provide a tire tread rebuilding machine having a novel quick release mechanism so that the operation may be stopped quickly for safety reasons and to prevent damage to the tire.

Another object of this invention is to provide a tire tread rebuilding machine in which the driving motor and the tire guiding rollers are controlled by foot actuated means so that the operator's hands are free to feed camelback onto the tire correctly.

Finally, it is an object to provide a tire tread rebuilding machine of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawings, which form a material part of this discolsure and wherein similar characters of reference indicate similar or identical elements and portions throughout the specification and throughout the views of the drawing, and in which:

Fig. 2 is a side elevation view of the machine in the operating position.

Fig. 3 is a fragmentary side elevation similar to Fig. 2 showing the driving roller in the released or non-operating position.

Fig. 5 is an enlarged fragmentary sectional view taken on the line 5—5 of Fig. 3, showing the structure of the idler rollers.

Fig. 6 is an enlarged fragmentary view of the line 6—6 of Fig. 2, showing the universal drive shaft structure.

Figure 7:
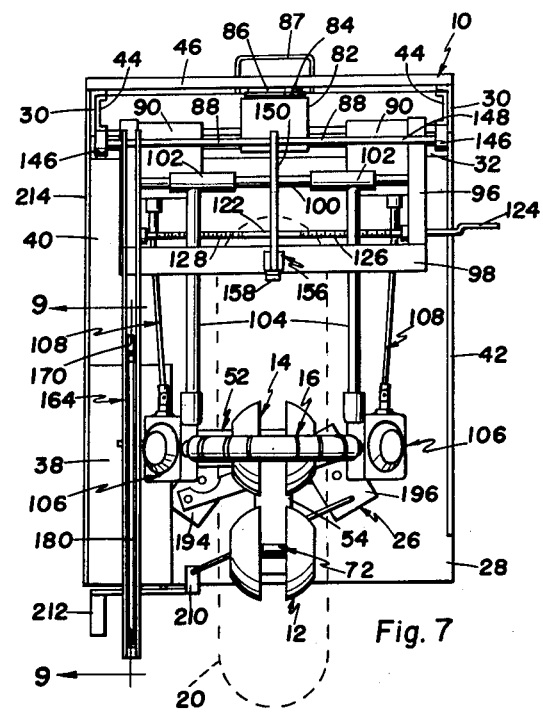
Fig. 7 is a plan view of the machine.

Referring now to the drawing, the machine comprises, basically, a frame 10 on which are mounted a pair of freely rotating idler rollers 12 and 14 which support the tire in position for the rebuilding operation. The driving roller 16 is pivotally mounted on the frame 10 and is in opposed, vertically spaced relationship with the rear idler roller 14 when in the operating position, said driving roller being driven through a universal gear mechanism by a motor 18. The tire, which is shown dotted at 20 in Figs. 2 and 7, is stabilized by guide rollers 22 and 24 which are resiliently held against the sides of the tire at the lower portion thereof. The guide rollers 22 and 24 are mounted on a foot actuated toggle mechanism 26, so that the tire may be released by foot pressure for removal from the machine.

More specifically, the frame 10 comprises a base plate 28 at the rear corners of which are uprights 30, braced at their upper ends by a cross beam 32. At one forward corner of the base plate 28 are a pair of uprights 34 and spaced rearwardly therefrom are a further pair of uprights 36. The uprights 34 and 36 are joined at their upper ends by a rectangular top plate 38. The uprights 34 and 36 are joined to the adjacent rear upright 30 by a top beam 40 to complete one side of the frame structure, the remaining upright 30 being braced to the base plate 28 by a gusset 42. Extending upwardly from the uprights 30 are side supports 44 which are joined at the top by a cross member 46. The frame structure is completed by a cross member 48 secured to the uprights 30, approximately midway between the cross beam 32 and the base plate 28, and a mounting bracket 50 secured to said cross member and said base plate, the mounting bracket 50 carrying the motor 18. It will be evident that the frame 10, as illustrated, is constructed from conventional angle and channel iron and sheet stock. Obviously the frame structure can be varied considerably without departure from the teaching in this disclosure.

Figure 8:
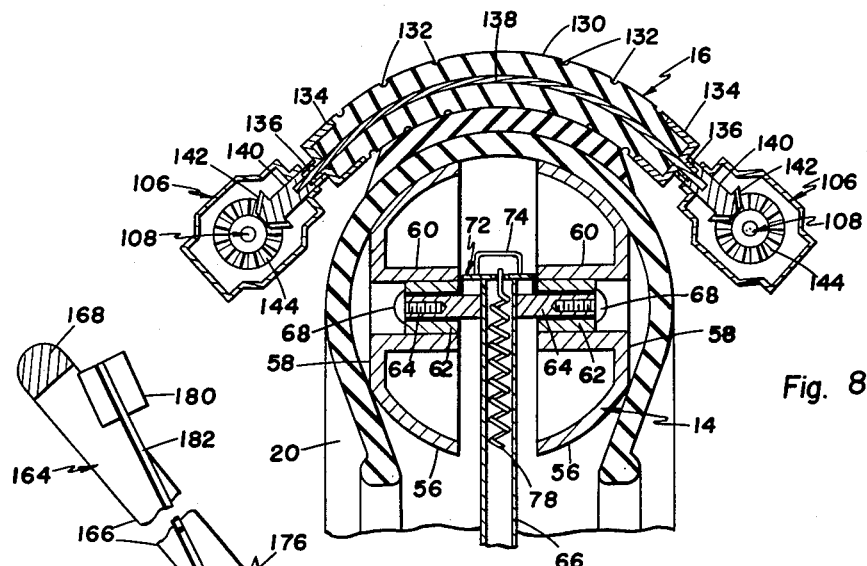
Fig. 8 is an enlarged fragmentary sectional view taken on the line 8—8 of Fig. 2, showing the driving roller applying the camelback to a tire.

Extending inwardly from beneath the top plate 38 is an L-shaped support member 52, the longitudinal arm 54 of which carries the idler rollers 12 and 14. The idler roller 14, as most clearly shown in Fig. 8, comprises a pair of hollow shells 56 which are substantially hemispherical and are provided with flat faces 58 at right angles to the axes thereof. Each shell 56 has an integral axial hub 60 in which is fitted a bushing 62. The shells 56 are rotatably mounted on stub shafts 64 secured to the upper end of a support tube 66, and are retained thereon by screws 68. The support tube 66 is mounted on and extends vertically upwardly from the arm 54. The idler roller 12 is similar in all respects to the idler roller 14, except that it is mounted on a support tube 70 which is shorter than the support tube 66, the idler roller 12 being positioned forwardly of and slightly lower than the idler roller 14.

Figure 11:
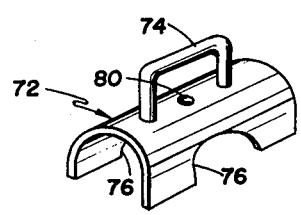
Fig. 11 is a perspective view of the spacer used with the idler rollers.

The shells 56 are separated by spacers 72 which are elongated, generally semi-cylindrical, with handles 74, as best illustrated in Fig. 11. The lower edges of the spacers 72 have opposed arcuate notches 76 which fit over the stub shafts 64 as shown in Fig. 5, said spacers being held in place by means of springs 78, the upper ends of which pass through apertures 80 in the spacers. The lower ends of the springs 78 are suitably secured at the lower end of the support tubes 66 and 70, thus holding the spacers 72 firmly in position. The idler roller assembly shown in Fig. 5 is suitable for use with the smaller sizes of tires. In order to accommodate larger tires, the shells 56 may be separated further and the roller widened by turning the spacer 72 through 90° to the position shown in Fig. 8 so that the full length of the spacer separates the shells.

Mounted on the cross beam 32 is a reduction gear box 82 having an external pulley 84 which is driven from the motor 18 by a belt 86, the pulley being enclosed for safety by a shield 87. Extending from the sides of the gear box 82 are hollow shafts 88 on which are mounted gear boxes 90, the drive from the gear box 82 to the gear boxes 90 extending through said hollow shafts. The internal structure of the various gear boxes and the particular arrangement of the gear drive mehanism is generally conventional and need not be described in detail in this disclosure. The gear boxes 90 are mounted on extension shafts 92 which are journalled in bearings 94 secured to the side supports 44.

Secured to the top of the gear boxes 90 are forwardly projecting end supports 96 which are joined at their forward ends by a cross bar 98. Secured between the end supports 96 is a rod 100 on which are slidably mounted a pair of sleeves 102. Extending forwardly from the sleeves 102 are support members 104 carrying at their ends the drive gear boxes 106, between which is the driving roller 16. The drive gear boxes 106 are operatively connected to the gear boxes 90 by universally jointed drive shafts 108. Each drive shaft 108 comprises a universal coupling 110 at the drive gear box 106, a universal coupling 112 at the gear box 90 and a rod 114 therebetween. As best shown in Fig. 6, at the universal coupling 112 there is a slip joint comprising a sleeve 116 having a longitudinal slot 118, the rod 114 being slidable in said sleeve and being locked against rotation therein by a pin 120 protruding into the slot 118.

Rotatably mounted between the end supports 96 is a screwed rod 122 having at one end a handle 124. The screwed rod 122 is threaded through the support members 104, one portion of said screwed rod having a right hand thread 126 and the other portion having a left hand thread 128. Thus by turning the handle 124, the gap between the support members 104 may be varied, which also varies the spacing of the drive gear boxes 106. By this means the curvature of the driving roller 16 is adjusted to suit different tire sizes. The slip joints in the drive shafts 108 allow for the slight variation in length due to adjustment of the screwed rod 122.

The driving roller 16 comprises a resilient roller body portion 130 of hard rubber or the like, which is provided with a plurality of annular grooves 132 to allow for distortion of the roller due to curvature. On each end of the roller 16 is an end cap 134 having a projecting hub 136. A flexible cable 138 is embedded in the roller body portion 130 and extends from each end thereof, said cable being secured in shaft portions 140 of bevel gears 142 which are attached to the hubs 136. The bevel gears 142 are enclosed in the drive gear boxes 106 and are meshed with bevel gears 144 attached to the drive shafts 108.

Near the top of the side supports 44 are a pair of bearings 146 in which is journalled a cross shaft 148. Extending from the cross shaft 148 is an arm 150, on the end of which is a pivoted link 152. This pivoted link 152 is pivotally connected to a further link 154 which, in turn, is pivotally attached to the cross member 46, the links 152 and 154 together comprising a foldable elbow 156. Attached to the link 154 is an upwardly extending hand lever 158 with which the elbow 156 is folded to raise the driving roller 16 as shown in Fig. 3. The cross member 46 is connected to the cross bar 98 at a convenient position near the top of the frame 10 by a spring 160 to assist the raising of the driving roller assembly. The link 154 is also biased by means of a spring 162 to prevent the inadvertent collapse of the elbow 156.

Figure 10:
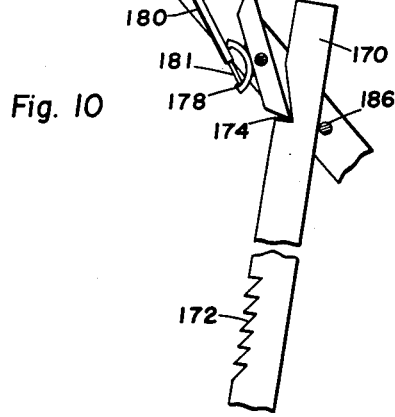
Fig. 10 is a sectional view similar to Fig. 9 but showing the release mechanism in the raised or released position.
Figure 9:
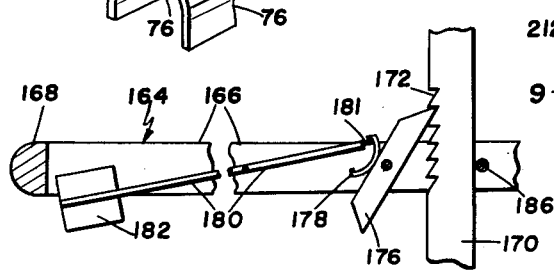
Fig. 9 is an enlarged fragmentary sectional view taken on the line 9—9 of Fig. 7, showing the release mechanism in the locked or operating position.

Also extending from the cross shaft 148 is a long handle 164, comprising a pair of closely spaced parallel bars 166 which are separated at their outer ends by a spacer block 168. Pivotally attached to the top beam 40 and extending upwardly therefrom is a locking bar 170 which passes between the bars 166. Slightly above the mid-point of the locking bar 170 are a plurality of serrations 172, while adjacent the top of said locking bar is a notch 174. Pivotally mounted between the bars 166 is a pawl 176 having fixed thereon a cam 178, said pawl being shaped to engage either the serrations 172 or the notches 174 as shown in Figs. 9 and 10, respectively. Also pivotally mounted between the bars 166 is a trigger rod 180, one end of which slides in the cam 178, the end of said trigger rod having therein a retractable plunger 181 which is suitably biased to bear on said cam. The other end of the trigger rod 180 is provided with a weight 182. The locking bar 170 is biased backwardly by a spring 184 at the lower end thereof and is held against a pin 186 fitted through the handle 164 adjacent the pawl 176.

Figure 4:
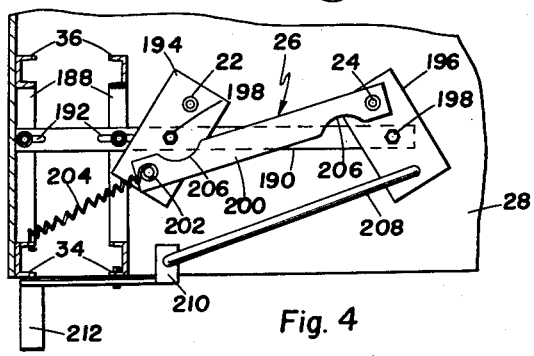
Fig. 4 is an enlarged fragmentary sectional view taken on the line 4—4 of Fig. 2 and showing the tire guide roller actuating mechanism.

Secured between the uprights 34 and 36 a short distance above the base plate 28 are a pair of support angles 188 which carry the toggle mechanism 26. Attached to these support angles 188 is an inwardly projecting extension bar 190 having slotted holes 192 to allow slight longitudinal adjustment. Pivotally mounted on the extension bar 190 are a pair of toggle plates 194 and 196 which are fastened by bolts 198. The guide rollers 22 and 24 are rotatably mounted on the toggle plates 194 and 196, respectively, on the rearward side of the extension bar 190, said guide rollers comprising tubular members extending upwardly to rest against opposite sides of a tire being processed on the machine. The guide roller 24 is shorter than the guide roller 22 to facilitate removal of the tire from that side. The toggle plates 194 and 196 are joined by a connecting bar 200, which is pivotally attached at the base of the guide roller 22 and crosses the extension bar 190 to be attached to the toggle plate 194 forwardly of the extension bar, as shown in Fig. 4, by means of a pin 202. A spring 204 is connected from the pin 202 to one of the uprights 34 so that the guide rollers are biased together. The connecting bar 200 has notches 206 to provide clearance for the bolts 198 in the extreme positions of the toggle mechanism.

Attached to the forward end toggle plate 196 is an actuating rod 208, the other end of which is attached to an L-shaped lever 210 pivotally mounted on one of the uprights 34. Extending forwardly from the lever 210 is a foot pedal 212, thus by depressing said foot pedal, the guide rollers 22 and 24 may be separated to release the tire held therebetween.

The frame 10 is partially enclosed by means of a side cover plate 214 and a back cover plate 216 for safety reasons and for protection. The motor 18 is, of course, connected to a source of power by a conductor 218 and is provided with a foot control switch 220.

Figure 1:
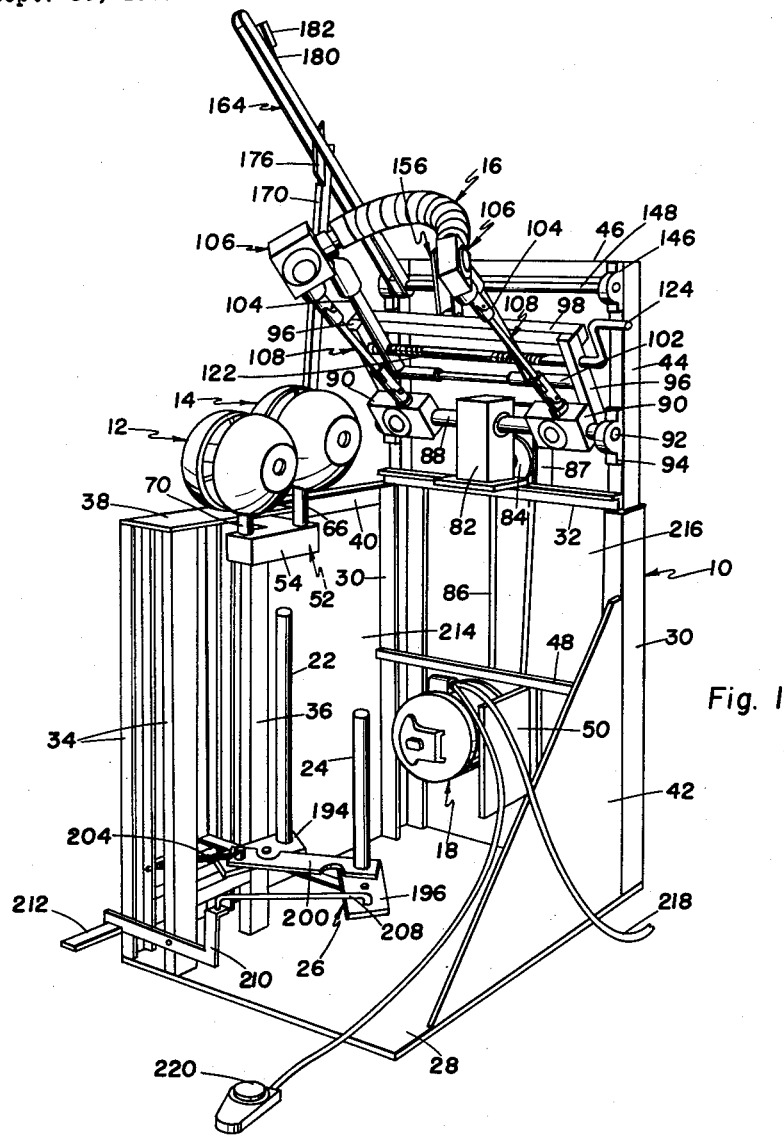
Fig. 1 is a perspective view of the machine.

The operation of the machine will now be described briefly. Starting with the machine in the non-operating position as shown in Fig. 1, the tire casing 20 to be rebuilt is placed over the idler rollers 12 and 14, which are adjusted by means of the spacers 72 to approximate the internal width of the tire. The foot pedal 212 is depressed to separate the guide rollers 22 and 24 so that the tire may be inserted therebetween, the foot pedal then being released to allow the guide rollers to hold the tire in place.

The handle 164, which is in the fully raised position and is engaged with the locking bar 170 as shown in Fig. 10, is now released by lifting the trigger rod 180 slightly to disengage the pawl 176 from the notch 174. The handle 164 is now lowered bringing the driving roller 16 towards the tire 20. The driving roller is brought into contact with the tire by pushing against the hand lever 158 to straighten the elbow 156. With the driving roller 16 resting on the tire, the pawl 176 is engaged with one of the serrations 172 as shown in Fig. 9, the pawl being retained by the weighted trigger rod 180. The handle 124 is now turned causing the screwed rod 122 to adjust the gap between the drive gear boxes 106. In this way the driving roller 16 is adjusted to the outer contour of the tire 20 to ensure even pressure during the rebuilding operation.

The driving roller 16 is next raised slightly from the tire to allow the camelback to be placed in position. This is accomplished by lifting the trigger rod 180, so releasing the pawl 176 and allowing the handle 164 to be lifted together with the entire driving roller assembly. The end of the camelback, which is shown dotted at 222 in Fig. 2, is then placed on the tire beneath the driving roller 16, which is then lowered and clamped in place by the handle 164 engaging the locking bar 170. The surface of the tire is, of course, suitably treated and coated with cement to receive the camelback, the actual process being well known to those skilled in the art.

The foot switch 220 is now actuated to operate the motor 18 and start the driving roller 16 rotating, which causes the tire 20 to rotate. As the tire rotates, the camelback is fed in manually and kept in alignment. After completing one revolution, the camelback is cut off and the joint spliced in an approved manner as practiced by those skilled in the art. A further revolution of the tire serves to complete the application of the camelback and the spliced joint.

The handle 164 is then released and raised to the non-operating position as shown in Fig. 1, thus raising the driving roller 16 from the tire. The foot pedal 212 is depressed to separate the guide rollers 22 and 24 and the tire is removed from the machine in readiness for the tread molding operation.

Should the camelback be applied incorrectly, or in case of danger to the operator, the machine is stopped quickly by releasing the foot switch 220. The driving roller 16 is released by an upward blow on the trigger rod 180 to release the handle 164, or by a forward pull on the hand lever 158 to collapse the elbow 156. In either case the motion of the tire is quickly arrested.

It will be evident that by providing foot actuated controls for the tire guide rollers and for the motor, the operator's hands are free to handle the tire and the camelback.

The operation of this invention will be clearly comprehended from a consideration of the foregoing description of the mechanical details thereof, taken in connection with the drawings and the above recited objects. It will be obvious that all said objects are amply achieved by this invention.

Further description would appear to be unecessary.

It is understood that minor variation from the form of the invention disclosed herein may be made without departure from the spirit and scope of the invention, and that the specification and drawing are to be considered as merely illustrative rather than limiting.

I claim:

1. In a tire tread rebuilding machine comprising a frame, at least one freely rotating idler roller assembly mounted on the frame which is adapted to substantially fit the interior curvature of a tire carcass, a flexible roller adapted to substantially fit the exterior curvature of a tire carcass, pivoted mounting means on the frame for moving the flexible roller toward and away from said idler roller, and means for driving said flexible roller, the improvement which comprises a gear mechanism connected to each end of said flexible roller, a drive gear box housing each of said gear mechanisms, a rigid support member connecting each of said drive gear boxes to a pivoted mounting on the frame, second gear boxes pivotally mounted on the frame, universally jointed drive shafts operatively connecting each of said drive gear boxes to said second gear boxes, a driving motor, and means operatively connecting said second gear boxes to said driving motor.

2. A tire tread rebuilding machine according to claim 1 wherein each of said second gear boxes is operatively connected to a common reduction gear box fixed on the frame, said common reduction gear box being further operatively connected to a driving motor.

3. In a tire tread rebuilding machine comprising a frame, at least one freely rotating idler roller assembly mounted on the frame which is adapted to substantially fit the interior curvature of a tire carcass, a flexible roller adapted to substantially fit the exterior curvature of a tire carcass, pivoted mounting means on the frame for moving the flexible roller toward and away from said idler roller, and means for driving said flexible roller, the improvement which comprises a gear mechanism connected to each end of said flexible roller, a drive gear box housing each of said gear mechanisms, a rigid support member connecting each of said drive gear boxes to a pivoted mounting on the frame, second gear boxes pivotally mounted on the frame, universally jointed drive shafts operatively connecting each of said drive gear boxes to said second gear boxes, a driving motor, means operatively connecting said second gear boxes to said driving motor, and a handle operatively connected with the pivoted mounted means for moving the flexible roller.

4. In a tire tread rebuilding machine comprising a frame, at least one freely rotating idler roller assembly mounted on the frame which is adapted to substantially fit the interior curvature of a tire carcass, a flexible roller adapted to substantially fit the exterior curvature of a tire carcass, pivoted mounting means on the frame for moving the flexible roller toward and away from said idler roller, and means for driving said flexible roller, the improvement which comprises a gear mechanism connected to each end of said flexible roller, a drive gear box housing each of said gear mechanism, a rigid support member connecting each of said drive gear boxes to a pivoted mounting on the frame, second gear boxes pivotally mounted on the frame, universally jointed drive shafts operatively connecting each of said drive gear boxes to said second gear boxes, a driving motor, and means operatively connecting said second gear boxes to said driving motor, means for quick release of the means for moving the flexible roller, whereby the pressure of the flexible roller on work being processed can be relieved.

5. In a tire tread rebuilding machine, a frame, means mounted on said frame for engaging a tire casing interiorly, an arched and elongated flexible roller, driving gear mechanisms operatively connected to each end of said flexible roller, spaced support arms for said gear mechanisms pivotally mounted on said frame, means to change the spacing of said support arms so that the arched shape of the flexible roller can be adjusted to fit the exterior of a tire being processed, a motor, and means operatively connecting said motor with said gear mechanisms including gear boxes on said frame and universally jointed shafts operably connected to and between said gear boxes and said gear mechanisms.

6. A tire tread rebuilding machine comprising a frame, freely rotating tire supporting idler rollers mounted on said frame, a driven flexible roller pivotally mounted on said frame, means for holding said flexible roller in driving contact with a tire casing on said idler rollers, means for shifting said flexible roller away from said idler rollers, means adjusting said flexible roller to fit the exterior curvature of the tire casing, and freely rotating guide rollers below said idler rollers, said guide rollers being biased to engage the sides of a tire casing therebetween.

7. A tire tread rebuilding machine comprising a frame, freely rotating tire supporting idler rollers mounted on said frame, a driven flexible roller pivotally mounted on said frame, means for holding said flexible roller in driving contact with a tire casing on said idler rollers, means for shifting said flexible roller away from said idler rollers, means for adjusting said flexible roller to fit the exterior curvature of the tire casing, freely rotating guide rollers below said idler rollers, said guide rollers being biased to engage the sides of a tire casing therebetween, and a foot actuated lever mechanism operatively connected to separate said guide rollers.

8. A tire tread rebuilding machine comprising a frame, freely rotating tire supporting idler rollers mounted on said frame, a flexible roller pivotally mounted on said frame, a motor operatively connected to rotate said flexible roller, and a remote control for said motor, means for holding said flexible roller in driving contact with a tire casing on said idler rollers, means for shifting said flexible roller away from said idler rollers, means for adjusting said flexible roller to fit the exterior curvature of the tire casing, freely rotating guide rollers below said idler rollers, said guide rollers being biased to engage the sides of a tire casing therebetween, and a foot actuated lever mechanism operatively connected to separate said guide rollers.

9. A tire tread rebuilding machine comprising a frame, freely rotating tire supporting idler rollers mounted on said frame, spaced support members pivotally mounted on said frame, a flexible roller rotatably mounted between said support members, a screw actuator connecting said support members to adjust the spacing therebetween, a motor operatively connected to rotate said flexible roller, means for holding said flexible roller in driving contact with a tire casing on said idler rollers, freely rotating guide rollers below said idler rollers, said guide rollers being biased to engage the sides of a tire casing therebetween, and a foot actuated lever mechanism operatively connected to separate said guide rollers.

10. A tire tread rebuilding machine comprising a frame, freely rotating tire supporting idler rollers mounted on said frame, spaced support members pivotally mounted on said frame, a flexible roller rotatably mounted between said support members, a screw actuator connecting said support members to adjust the spacing therebetween, a motor operatively connected to rotate said flexible roller, a handle operatively connected to said support members, a locking bar engaging said handle to hold said flexible roller in driving contact with a tire casing on said idler rollers, a quick release mechanism in said handle for raising said flexible roller, freely rotating guide rollers below said idler rollers, said guide rollers being biased to engage the sides of a tire casing therebetween, and a foot actuated lever mechanism operatively connected to separate said guide rollers.

11. A tire tread rebuilding machine comprising a frame, freely rotating tire supporting idler rollers mounted on said frame, spaced support members pivotally mounted on said frame, a flexible roller rotatably mounted between said support members, a screw actuator connecting said support members to adjust the spacing therebetween, a motor operatively connected to rotate said flexible roller, an arm pivotally mounted on said frame, a collapsible elbow interconnecting said arm and said support members, said elbow comprising a pair of hinged links, a hand lever on one of said links for manually collapsing said elbow, a handle operatively connected to said arm, a locking bar engaging said handle to hold said flexible roller in driving contact with a tire casing on said idler rollers, a quick release mechanism in said handle for raising said flexible roller, freely rotating guide rollers below said idler rollers, said guide rollers being biased to engage the sides of a tire casing therebetween, and a foot actuated lever mechanism operatively connected to separate said guide rollers.

12. A tire tread rebuilding machine according to claim 10, wherein said quick release mechanism includes a pawl pivotally mounted in said handle, said locking bar having spaced notches to receive said pawl, and a trigger engaging said pawl selectively in said notches.

13. A tire tread rebuilding machine according to claim 1, wherein said idler roller means comprises a pair of spaced substantially hemispherical shells rotatably mounted on a common axis, said shells having flattened faces at right angles to the axis thereof.

14. A tire tread rebuilding machine according to claim 13, wherein said idler roller assembly comprises a spacer between said shells, said spacer being adjustable to vary the spacing of said shells.

15. A tire tread rebuilding machine according to claim 1, wherein said flexible roller comprises a cylindrical flexible roller element, a flexible cable embedded along the axis of said element, and end caps secured to said element and said cable.

16. A machine according to claim 5 and including a lever pivoted on said frame, and mechanical linkage between said lever and said support arms, whereby the support arms along with the flexible roller can pivotally shift toward and away from said means for engaging a tire interiorly.

17. A machine according to claim 16 and including a quick release means operatively interposed between said lever and said support arms, whereby the flexible roller can be released in an emergency without movement of the lever.

18. A machine according to claim 5 and wherein the first mentioned means includes a pair of hemispherical shells, mounted on a common axis, the said shells having flat sides disposed in face to face relation.

19. A machine according to claim 18 and including means for adjustably spacing said shells.

20. A machine according to claim 5 and including spaced vertical tire-stabilizing idler guide rollers mounted on the machine below the first mentioned means.

21. A machine according to claim 20 and including foot control means for adjusting the spacing of said guide rollers.

References Cited in the file of this patent

UNITED STATES PATENTS

| | | |
|---|---|---|
| 2,474,511 | Bacon | June 28, 1949 |
| 2,498,953 | Glynn | Feb. 28, 1950 |
| 2,556,264 | Flynn | June 12, 1951 |
| 2,703,131 | Robbins et al. | Mar. 1, 1955 |